United States Patent [19]

Bradshaw et al.

[11] Patent Number: 5,311,773
[45] Date of Patent: May 17, 1994

[54] METHOD OF AND AN APPARATUS FOR MISFIRE AND ROUGH ROAD DETECTION

[75] Inventors: Benjamin J. Bradshaw, West Midlands; Russel W. Jones, Stratford-on-Avon; Stuart M. Briscoe, West Midlands, all of England

[73] Assignee: Lucas Industries, United Kingdom

[21] Appl. No.: 4,342

[22] Filed: Jan. 14, 1993

[30] Foreign Application Priority Data

Jan. 16, 1992 [GB] United Kingdom ............... 9200920

[51] Int. Cl.$^5$ ........................................... G01M 15/00
[52] U.S. Cl. ....................................... 73/116; 123/419
[58] Field of Search ............... 73/118.1, 116, 495, 73/514; 123/419

[56] References Cited

U.S. PATENT DOCUMENTS 4,893,600 1/1990 Holmes ............................ 123/419

FOREIGN PATENT DOCUMENTS 497475 8/1992 European Pat. Off. ............ 123/419

Primary Examiner—Jerry W. Myracle
Attorney, Agent, or Firm—Andrus, Sceales, Starke & Sawall

[57] ABSTRACT

Engine speed variations following combustion events within the cylinders of a multi-cylinder internal combustion engine are compared with a threshold during a predetermined number of combustion events. A distribution of speed variations exceeding the threshold with respect to the cylinders is formed. The distribution is analyzed to determine whether misfire is occurring, as indicated by speed variation following combustion occurring in half or less than half of the cylinders, or whether the vehicle is driving over a rough surface, as indicated by speed variation following combustion occurring in more than half of the cylinders.

28 Claims, 3 Drawing Sheets

METHOD OF AND AN APPARATUS FOR MISFIRE AND ROUGH ROAD DETECTION

The present invention relates to a method of and an apparatus for misfire detection. The present invention further relates to a method of and an apparatus for rough road detection.

A known technique for detecting misfire in an internal combustion engine detects variations in engine crankshaft speed following combustion events in the engine. The crankshaft speed variations are compared with a threshold value and significant numbers of variations exceeding the threshold value are taken as indicative of engine misfire.

Although such a technique provides acceptable misfire detection in many circumstances, problems can occur when the engine is driving a vehicle over a rough road, particularly at low speeds and high gear ratios. In this case, the road surface irregularities may be fed back through the vehicle transmission to the engine crankshaft and cause speed variations which are not related to whether the engine is misfiring. For sufficiently rough road surfaces, the resulting speed variations can exceed the threshold value, thus causing false misfire detection to take place.

According to a first aspect of the invention, there is provided an apparatus for detecting misfire in a multi-cylinder internal combustion engine, comprising means for comparing engine output shaft speed variations following engine combustion events with a threshold value, distribution forming means for forming a distribution of the numbers of the speed variations exceeding the threshold value with respect to the cylinders, and means for signalling a misfire when the numbers are predominantly distributed among less than a predetermined number of the cylinders.

The signalling means may be arranged to signal a misfire when the numbers are predominantly distributed among less than half, or less than or equal to half, the number of cylinders of the engine.

The signalling means may be arranged to signal a misfire when the numbers are greater than zero for less than the predetermined number of cylinders.

According to a second aspect of the invention, there is provided an apparatus for detecting movement of a vehicle driven by a multi-cylinder internal combustion engine over a rough surface, comprising means for comparing engine output shaft speed variations following engine combustion events with a threshold value, distribution forming means for forming a distribution of the numbers of the speed variations exceeding the threshold value with respect to the cylinders, and means for signalling a rough surface when the numbers are distributed among more than a preset number of the cylinders.

The signalling means may be arranged to signal a rough surface when the numbers are predominantly distributed among greater than half the number of cylinders of the engine.

The predetermined number may be equal to or differ from the preset number.

Means may be provided for periodically resetting the numbers to zero.

Means may be provided for inhibiting the signalling means when the total number of speed variations exceeding the threshold value for a predetermined number of combustion events is less than a predetermined threshold.

The distribution forming means may further comprise means for calculating the average number of the speed variations exceeding the threshold value and means for subtracting the average number from each of the numbers allocated to the cylinders.

The threshold value may be fixed or may vary, for instance with engine or vehicle speed or load.

The distribution forming means may be arranged to allocate the numbers of the speed variations exceeding the threshold value to the cylinders during or following whose combustion events the speed variations occurred.

According to a third aspect of the invention, there is provided a method of detecting misfire in a multi-cylinder internal combustion engine, comprising comparing engine output shaft speed variations following engine combustion events with a threshold value, forming a distribution of the numbers of the speed variations exceeding the threshold value with respect to the cylinders, and signalling a misfire when the numbers are predominantly distributed among less than a predetermined number of the cylinders.

According to a fourth aspect of the invention, there is provided a method of detecting movement of a vehicle driven by a multi-cylinder internal combustion engine over a rough surface, comprising comparing engine output shaft speed variations following engine combustion events with a threshold value, forming a distribution of the numbers of the speed variations exceeding the threshold value with respect to the cylinders, and signalling a rough surface when the numbers are distributed among more than a preset number of the cylinders.

It is thus possible to provide an arrangement for improving the reliability of detection of engine misfire by reducing the number of false detections caused by output shaft speed variations resulting from causes other than misfire. In particular, the false misfire detections caused by movement of a vehicle driven by the engine over a rough road can be substantially reduced. Further, no additional sensors or transducers are required in the case where an engine output shaft position or speed transducer is already provided.

It is also possible to provide an arrangement for detecting when a vehicle is being driven over a relatively rough surface. Such detection may be used to influence the operation of vehicle systems, such as antilock brake systems, traction control systems, and suspension systems.

The invention will be further described, by way of example, with reference to the accompanying drawings, in which.

Figure 1:
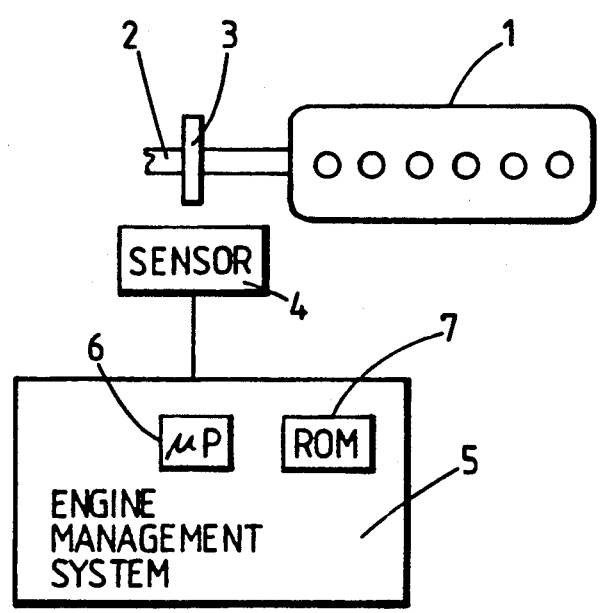
FIG. 1 is a schematic diagram of an apparatus constituting an embodiment of the invention.

FIG. 1 shows a four stroke six cylinder internal combustion engine 1 having an output shaft 2 provided with a position transducer. The position transducer is shown as comprising a toothed wheel 3 and a sensor 4 of the variable reluctance type, but any suitable transducer may be used. A similar sensor driven at half engine speed, for instance from a camshaft of the engine, may also be provided to permit cylinder identification. The output of the sensor 4 is connected to an engine management system 5 which includes a microprocessor 6 and a read only memory 7. The read only memory 7 contains a program for controlling operation of the microprocessor 6 and hence of the engine management system 5, which controls ignition timing and the strength and quantity of combustible mixture supplied to the engine 1.

One of the functions of the microprocessor 6 is to determine the speed of the output shaft 2 of the engine 1. This is normally done by measuring the time period between predetermined rotary positions of the toothed wheel 3 so as to provide a measure of output shaft speed which is inversely proportional to the actual speed. For instance, the time of passage of one or more predetermined teeth of the wheel 3 may be measured. Variations in output shaft speed are then determined by taking the difference between consecutive speed or period measurements. The measurements are taken at regular intervals so as to provide a measure of output shaft speed following each combustion event of each cylinder of the engine 1. Alternatively, the techniques disclosed in EPO 442 687 may be used.

Figure 2:
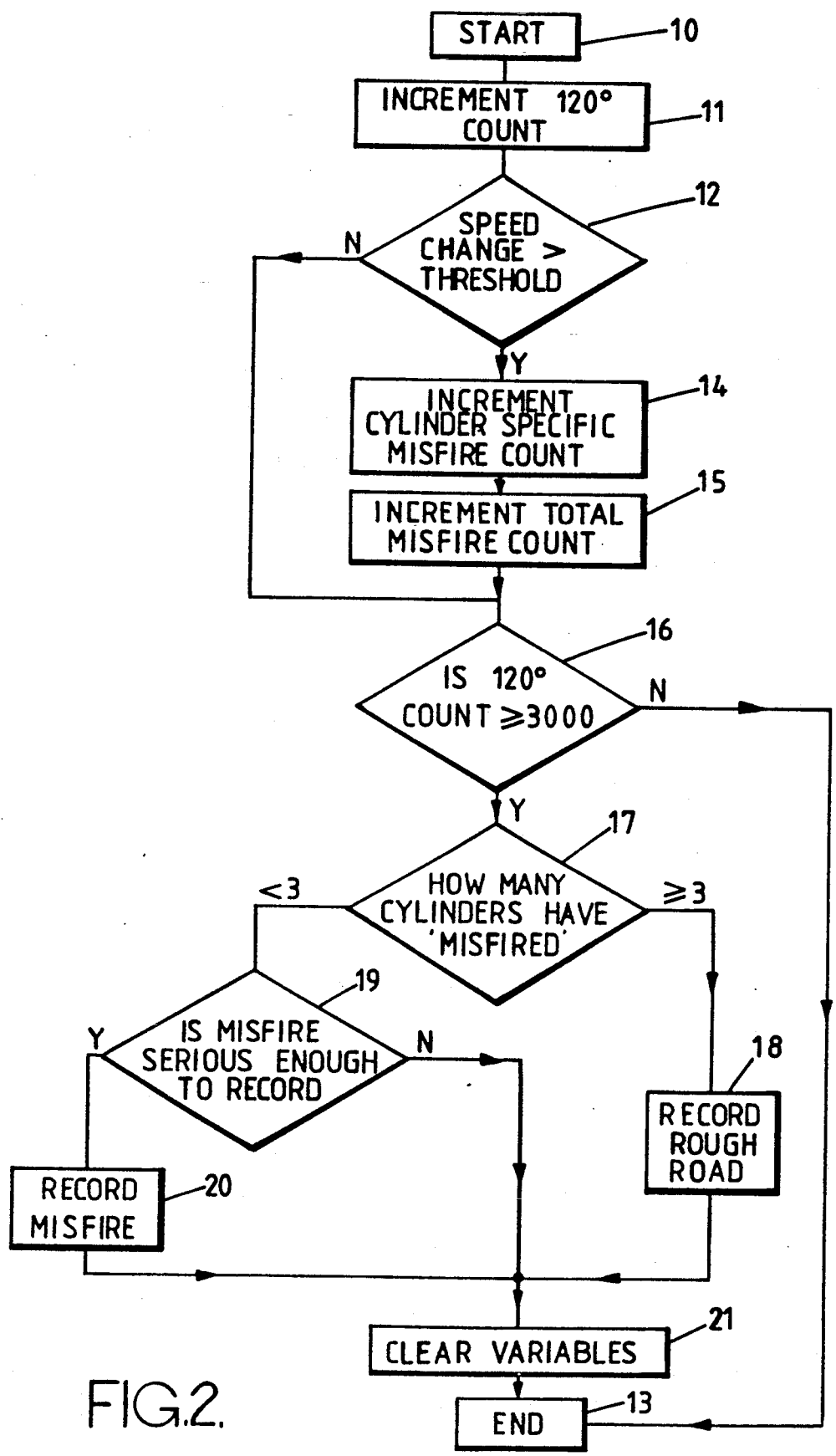
FIG. 2 is a flow diagram illustrating operation of the apparatus of FIG. 1.

In order to perform misfire and rough road detection, the memory 7 contains, among other things, a program for causing the microprocessor 6 to operate as illustrated in the flow diagram of FIG. 2. This flow diagram shows a routine in the form of an interrupt routine which is performed after each 120° of rotation of the output shaft 2 of the engine 1. The routine is entered at 10 and, at 11, a count of the number of 120° rotations of the output shaft is incremented. The routine receives speed change data for each incremental rotation from another part of the program stored in the memory 7 and, at 12, compares the speed change with a threshold. If the speed change is less than the threshold, control passes to step 16.

If the speed change exceeds the threshold, then a counter associated with the cylinder which has just fired is incremented at 14. At 15, the total number of misfires is incremented. At 16, the number of 120° rotations is compared with a predetermined number, for instance 3000, corresponding to the total number of cylinder combustion events over which the misfire and rough road detection is cyclically performed. If the number of combustion events is less than 3000, the routine ends at 13. If the number of combustion events is greater than or equal to 3000, a step 17 determines how many cylinders have misfired in the test period which has just been completed. If three or more of the six cylinders of the engine 1 have been indicated as having misfired, then a step 18 records a rough road. If the number of misfiring cylinders is less than three, a step 19 determines whether the misfire is serious enough to be recorded. If so, then it is recorded at 20. Otherwise, the combustion event count 11, the cylinder specific misfire count 14, and the total misfire count 15 are reset at 21 and the routine ends at 13.

The step 17 for determining how many cylinders have misfired may be performed in several ways. For instance, the number of misfiring cylinders may be set equal to the number of cylinders which recorded at 14 a number of "misfires", greater than zero. Alternatively, the number of misfires for each cylinder may be divided by the total number of misfires determined at 15 and the resulting fraction expressed as the contribution of each of the cylinders to the total number of misfires as a percentage. This may then be compared with a predetermined percentage, for instance zero, to indicate whether the cylinder has misfired, and the number of misfiring cylinders may then be compared with three as shown at 17 in FIG. 2.

It is also possible to insert an additional step between the steps 16 and 17, which additional step divides the total number of misfires by the number of engine cylinders to obtain an average value and subtracts the average value from each of the cylinder misfire counts determined at 14. The step 17 then determines the number of cylinders whose misfire counts are greater than zero and compares this with three as shown in FIG. 1, so that the effects of a rough road can be at least partially removed and misfire detection while the vehicle is travelling over a rough road can be performed.

The step 20, apart from recording the occurrence of misfire, may also indicate the cylinder or cylinders of the engine which are responsible for the misfiring. Thus, an appropriate remedial action may be taken by the engine management system 5, such as adjusting the strength of the combustible mixture supplied to one or more of the engine cylinders.

The step 19 for deciding whether the misfire is sufficiently serious to be recorded may be performed in various ways. For instance, the total number of misfires determined in step 15 may be divided by the total number of 120° increments (3000 as defined in the step 16) and expressed as a percentage of misfires out of the total number of combustion events. If the misfire percentage is greater than a predetermined percentage, then a misfire is recorded at 20. If the misfire percentage is less than or equal to the predetermined percentage, the misfire is considered not serious enough to require recording and remedial action.

Figure 3:
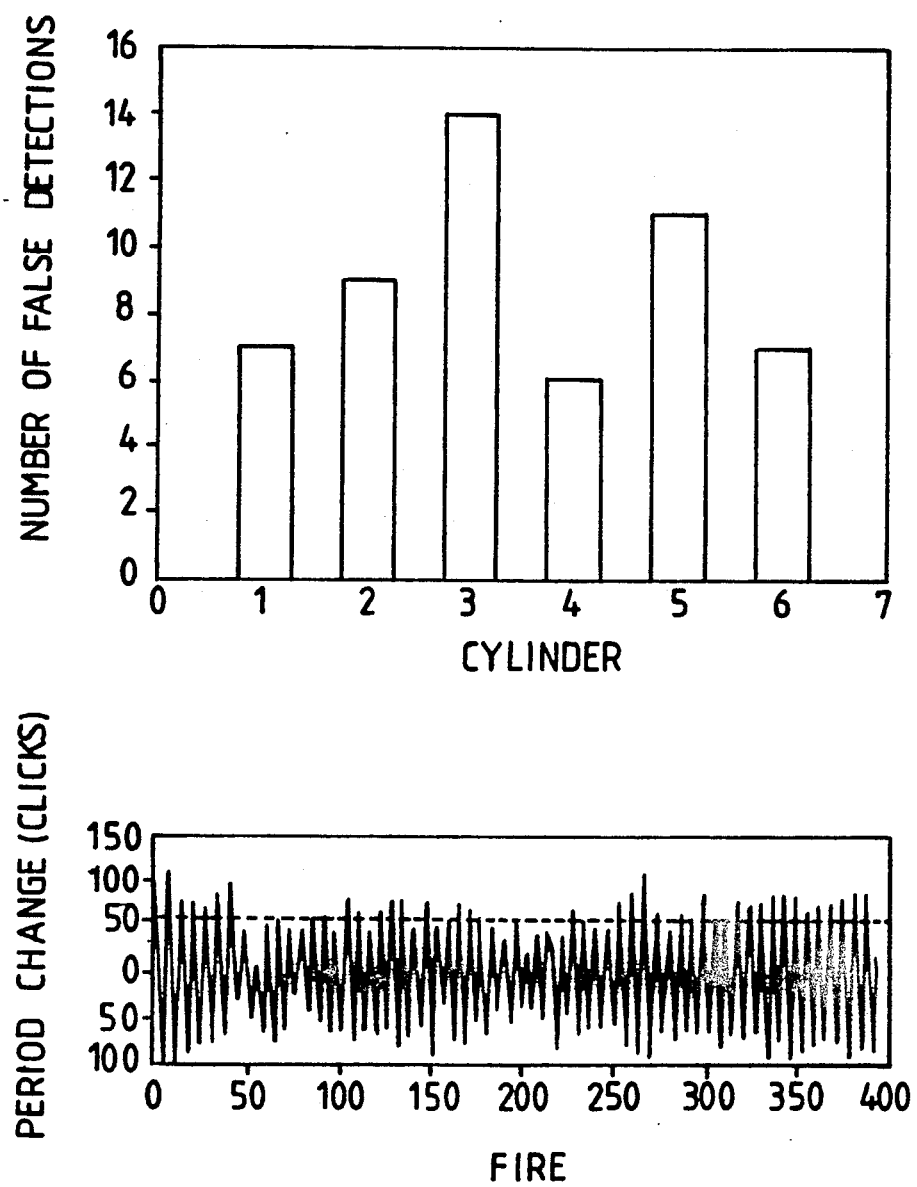
FIG. 3 illustrates graphically test results obtained with the apparatus of FIG. 1.

FIG. 3 illustrates graphically the results of a test using the apparatus illustrated in FIGS. 1 and 2. The lower graph records the period changes, corresponding to engine output shaft speed variations, against individual combustion events for 400 such events, and illustrates a threshold value by means of a broken line. Thus, period changes above the threshold value are recorded as misfires, whether actually caused by engine misfire or caused by road roughness.

The upper histogram of FIG. 3 shows the distribution of recorded misfires among the six cylinders of the engine 1. In this case, misfires were recorded for all of the cylinders of the engine, so that the number of misfiring cylinders in step 17 of FIG. 2 is equal to six. This corresponds to a rough road rather than a genuine engine misfire, and the rough road is recorded in the step 18.

It is thus possible to provide an arrangement for discriminating between actual engine misfire and the effects of a rough road surface on speed variations measured at an engine output shaft. For the type of engine and engine management system shown in FIG. 1 with a crankshaft position transducer, no additional hardware is necessary in order to perform the routine of FIG. 2. Instead, the software in the memory 7 merely requires augmenting in order for the engine management system 5 to perform the routine shown in FIG. 2. In general, the memory and microprocessor will have sufficient spare capacity to include the additional program routine so that larger or more powerful hardware is not necessary.

The detection of rough roads may be limited to conditions known to affect engine speed, for example low speeds and/or high transmission ratios.

The rough road indication may be used for various purposes. For instance, it may be used to adapt threshold levels for wheel spin or wheel slip detection, for instance in anti-lock brake systems and traction control systems. Also, such an indication may be used by active or partially active suspension systems, for instance to change spring and/or damper rates.

We claim:

1. An apparatus for detecting misfire in a multi-cylinder internal combustion engine having an output shaft, said apparatus comprising comparing means for comparing engine output shaft speed variations following engine combustion events with a threshold value, distribution forming means for forming a distribution of numbers of the speed variations exceeding the threshold value with respect to the cylinders, and misfire signalling means for signalling a misfire when the numbers are predominantly distributed among less than a predetermined number of the cylinders.

2. An apparatus as claimed in claim 1, in which said misfire signalling means is arranged to signal a misfire when the numbers are predominantly distributed among less than half of the cylinders of the engine.

3. An apparatus as claimed in claim 2, in which said misfire signalling means is further arranged to signal a misfire when the numbers are predominantly distributed among half of the cylinders of the engine.

4. An apparatus as claimed in claim 1, in which said misfire signalling means is arranged to signal a misfire when the numbers are greater than zero for less than the predetermined number of cylinders.

5. An apparatus as claimed in claim 1, further comprising reset means for periodically resetting the numbers to zero.

6. An apparatus as claimed in claim 1, further comprising inhibiting means for inhibiting said misfire signalling means when a total number of speed variations exceeding the threshold value for a predetermined number of combustion events is less than a predetermined threshold.

7. An apparatus as claimed in claim 1, in which said distribution forming means further comprises averaging means for calculating an average number of speed variations exceeding the threshold value and subtracting means for subtracting the average number from each of the numbers allocated to the cylinders.

8. An apparatus as claimed in claim 1, further comprising rough surface signalling means for signalling movement of a vehicle driven by the multi-cylinder internal combustion engine over a rough surface when the numbers are distributed among more than a preset number of cylinders.

9. An apparatus as claimed in claim 8, in which the preset number is equal to the predetermined number.

10. An apparatus as claimed in claim 1, in which the threshold value is a function of at least one of engine speed and vehicle speed and load.

11. An apparatus as claimed in claim 1, in which said distribution forming means allocates the numbers of the speed variations exceeding the threshold value to the cylinders during whose combustion events the speed variations occurred.

12. An apparatus as claimed in claim 1, in which said distribution forming means allocates the numbers of the speed variations exceeding the threshold value to the cylinders following whose combustion events the speed variations occurred.

13. An apparatus for detecting movement of a vehicle driven by a multi-cylinder internal combustion engine over a rough surface, the engine having an output shaft, said apparatus comprising comparing means for comparing engine output shaft speed variations following engine combustion events with a threshold value, distribution forming means for forming a distribution of the numbers of the speed variations exceeding the threshold value with respect to the cylinders, and rough surface signalling means for signalling a rough surface when the numbers are distributed among more than a preset number of cylinders.

14. An apparatus as claimed in claim 13, in which said rough surface signalling means is arranged to signal a rough surface when the numbers are predominantly distributed among greater than half of the cylinders of the engine.

15. An apparatus as claimed in claim 13, further comprising reset means for periodically resetting the numbers to zero.

16. An apparatus as claimed in claim 13, in which said distribution forming means allocates the numbers of the speed variations exceeding the threshold value to the cylinders during whose combustion events the speed variations occurred.

17. An apparatus as claimed in claim 13, in which said distribution forming means allocates the numbers of the speed variations exceeding the threshold value to the cylinders following whose combustion events the speed variations occurred.

18. A method of detecting misfire in a multi-cylinder internal combustion engine having an output shaft, comprising comparing engine output shaft speed variations following engine combustion events with a threshold value, forming a distribution of numbers of the speed variations exceeding said threshold value with respect to the cylinders, and signalling a misfire when the numbers are predominantly distributed among less than a predetermined number of the cylinders.

19. A method as claimed in claim 18, in which a misfire is signalled when the numbers are predominantly distributed among less than half of cylinders of the engine.

20. A method as claimed in claim 19, in which a misfire is signalled when the numbers are predominantly distributed among half of the cylinders of the engine.

21. A method as claimed in claim 18, in which the numbers are periodically reset.

22. A method as claimed in claim 18, in which the distribution is formed by allocating the numbers of the speed variations exceeding the threshold value to the cylinders during whose combustion events the speed variations occurred.

23. A method as claimed in claim 18, in which the distribution is formed by allocating the numbers of the speed variations exceeding the threshold value to the cylinders following whose combustion events the speed variations occurred.

24. A method of detecting movement of a vehicle driven by a multi-cylinder internal combustion engine over a rough surface, the engine having an output shaft, said method comprising comparing engine output shaft speed variations following engine combustion events with a threshold value, forming a distribution of numbers of the speed variations exceeding said threshold value with respect to the cylinders, and signalling a rough surface when the numbers are distributed among more than a preset number of cylinders.

25. A method as claimed in claim 24, in which a rough surface is signalled when the numbers are predominantly distributed among greater than half of the cylinders of the engine.

26. A method as claimed in claim 24, in which the numbers are periodically reset.

27. A method as claimed in claim 24, in which the distribution is formed by allocating the numbers of the speed variations exceeding the threshold value to the cylinders during whose combustion events the speed variations occurred.

28. A method as claimed in claim 24, in which the distribution is formed by allocating the numbers of the speed variations exceeding the threshold value to the cylinders following whose combustion events the speed variations occurred.

* * * * *